United States Patent [19]

Koyama et al.

[11] 4,412,848

[45] Nov. 1, 1983

[54] HEAT RECOVERY METHOD FROM GASIFIED PRODUCTS OF HYDROCARBON

[75] Inventors: Shuntaro Koyama, Hitachi; Tomohiko Miyamoto, Takahagi; Shinji Tanaka, Hitachi; Hiroshi Miyadera, Hitachi; Sadao Takahashi, Hitachi, all of Japan

[73] Assignee: The Agency of Industrial Science and Technology, Tokyo, Japan

[21] Appl. No.: 361,270

[22] Filed: Mar. 24, 1982

[30] Foreign Application Priority Data

Apr. 28, 1981 [JP] Japan .................................. 56-63346

[51] Int. Cl.³ .............................................. C10J 3/46
[52] U.S. Cl. ................................. 48/197 R; 48/206; 48/210; 55/20; 55/69; 55/77; 55/80; 55/99
[58] Field of Search .................... 48/197 R, 206, 210; 55/20, 68, 77, 80, 69, 99; 122/5

[56] References Cited

U.S. PATENT DOCUMENTS

| | | | |
|---|---|---|---|
| 2,591,595 | 4/1952 | Ogorzaly | 48/210 X |
| 3,007,545 | 11/1961 | Kimberlin, Jr. et al. | 55/77 X |
| 4,004,885 | 1/1977 | Groenendaal et al. | 55/99 X |
| 4,198,212 | 4/1980 | Tsao | 122/5 X |
| 4,233,275 | 1/1980 | Kimura et al. | 48/210 X |
| 4,247,302 | 1/1981 | Woldy et al. | 55/80 X |
| 4,372,937 | 2/1983 | Johnson | 55/80 X |

FOREIGN PATENT DOCUMENTS

3102819 2/1982 Fed. Rep. of Germany .......... 55/80

Primary Examiner—Arthur D. Kellogg
Attorney, Agent, or Firm—Birch, Stewart, Kolasch and Birch

[57] ABSTRACT

The present invention is done on the basis of knowledge obtained from experimental results shown in FIG. 1 with respect to a heat recovery method from gasified products of hydrocarbon. The heat recovery method from gasified products of hydrocarbon of the invention is to introduce the gas containing oily matters produced by gasification of hydrocarbon into the fluidizied bed where heat is recovered by indirect heat exchange between said product gas and the cooling agent passing through the heat transfer tube arranged in the fluidized bed, in which said product gas is passed through high temperature fluidized bed kept at about 450°–500° C. and then through the low temperature fluidized bed kept at about 250°–300° C. successively and that the heat of said product gas is recovered by heat exchange in said high temperature fluidized bed and low temperature fluidized bed respectively. The heat recovery method by the invention is able to increase the heat recovery quantity of product gas by the fluidized bed heat exchanger and remarkably decrease the possibility of plugging by coking at the gas cooling.

2 Claims, 6 Drawing Figures

HEAT RECOVERY METHOD FROM GASIFIED PRODUCTS OF HYDROCARBON

TECHNICAL FIELD

The present invention relates to a heat recovery method, especially to the heat recovery method in which high temperature gas containing oily matters (tar) produced by gasification of hydrocarbon is introduced into a fluidized bed provided with a heat transfer tube and thus indirect heat exchange is carried out.

BACKGROUND ART

Gas, oily matters (tar), solid hydrocarbon (char) and ash are produced in gasification of such hydrocarbons as coal, vacuum residual oil, dry asphalt, tar sand, oil shale and mixtures of them. The gasification temperature is so high (600°–1500° C.) that it is necessary to improve thermal efficiency of the whole gasification plant by effectively recovering sensible heat of products. In this process, it is effective to recover heat from gas with the highest sensible heat (containing oily matter) among said products. Heat recovery method by indirect heat exchange with a fluidized bed type has been developed for this purpose. According to the method, sensible heat of gas is extracted in the form of high temperature steam from the heat transfer tube by introducing said gas into the fluidized bed with heat transfer tube and carrying out heat exchange through fluidized particles. In this case a part of oily matters are cooled to cokes. But cokes are deposited on the surfaces of actively moving fluidized particles, so there is no possibility of plugging of equipments by coking as occurred in a shell and tube type heat exchanger method. If cokes deposit on the surface of heat transfer, they are scraped continually off by actively moving fluidized particles and do not accumulate on the surface of the tube and heat transfer efficiency is constantly kept at the initially established level.

It is desirable for the heat recovery method by heat exchange system with use of the fluidized bed to lower the operating temperature of the fluidized bed heat exchanger in order to increase heat recovery efficiency and recovery quantity from oily matter (cokes quantity), but if the operation temperature lowers, the temperature of the recovered steam lowers, quality of recovered heat degrades and oily matters do not deposit at the coke state but liquid state on the fluidized particles and movement of fluidizing particles are hindered. In addition, in order to regenerate particles by removing cokes accumulated on particles, regenerating processes such as a fluidized bed boiler or a combustion furnace should be added, and equipments become complex and require higher cost and the operation and the control get complicated.

Because of the above facts, the lowest operating temperature of the fluidized bed heat exchanger is set about 400°–450° C. conventionally, and it has been tried to use the identical particles with those used in the gasifier as fluidized particles and to regenerate particles by the gasifier itself. In these methods, however, heat recovery efficiency is not always satisfactory and it is generally difficult to apply the methods to various types of processes.

FIG. 1 shows the results of the experiments forming the basis of the invention. In this experiment, high temperature product gas produced by gasifying the mixture of coal and residual oil by vacuum distillation with oxygen and steam is passed through the fluidized bed with sand and the increase of the sand weight is measured with the passage of time. In FIG. 1, the time elapsed T(h) from the start of passing the product gas is marked on the axis of abscissas and the weight increase W (kg) calculated from the initial weight of the filling-up matters in the bed and ultimate analysis of fluidized particles at the each point of time is marked on the axis of ordinates. The temperature of thermal cracking zone in the gasifier is 750°–780° C. and temperature control of sand fluidized bed was done by an electric heater.

The following facts are known from the experimental results in FIG. 1.

(1) Cokes deposit on sands steadily with the passage of time, but the increase ratio of deposit amount drops when one hour passed as for instancce, the curve over 450° C. shows. This is because deposited cokes are peeled off by the rubbing of particles and rubbed cokes are dispersed with gas.

(2) The fluidized bed gets wet at low temperature within relatively short time and the fluidization is hindered (oblique-lined portion). This phenomenon is not seen above 450° C.

(3) The deposit amount (to be referred to as critical deposit amount in the following) which causes a fluidization hindrance is nearly definite at any temperature.

It is known from the above facts that the balance between the amount of fed oily matters and coking rate affects the coking amount in the fluidized bed. If the feeding amount exceeds the coking rate, liquid matters deposit in the bed and hinders the fluidization, but, below a certain deposit amount, the fluidization is not affected. Therefore stable operation can be obtained at low temperature of about 300° C. with deposit amount below the critical deposit amount in the fluidized bed.

The control of deposit amount below the critical point is obtained by regenerating the particles in the bed. As shown by the curving line of 300° C. in FIG. 1, regenerating should be done within 12 minutes and residence time of the particles should be extremely short. It is proposed to circulate the fluidized bed particles between the heat recovery zone and regeneration zone (for example, Published unexamined patent application Showa 51-127101, Japanese official bulletin), but by this method the large amount of particle must be circulated and this increases the power cost and decreases operativity.

OBJECT OF THE INVENTION

The present invention was contrived on the basis of the conventional technique and experimental results and of the knowledge obtained by examining on them. The object is to offer a heat recovery method from hydrocarbon gas products without plugging of equipments with coking at the cooling and to recover heat of favorable quality at high heat recovery efficiency by the fluidized bed heat exchanger.

SUMMARY OF THE INVENTION

The present invention is, concerning the heat recovery method in which high temperature product gas containing oily matters produced by gasifying hydrocarbon is introduced to the fluidized bed where heat is recovered by indirect heat exchange between a cooling agent passing through the thermal transfer tube provided in the fluidized bed and the product gas, characteristic in having a structure in which the high temperature product gas is passed through the high temperature fluidized bed kept at about 450°–500° C. and then through the low temperature fluidized bed kept at about 250°–300° C. successively and the heat of the product gas is recovered by each heat exchange in the high temperature fluidized bed and the low temperature fluidized bed.

DETAILED DESCRIPTION OF THE PREFERRED EMBODIMENT OF THE INVENTION

The preferred embodiment of the invention will be described in detail according to the drawings in the following.

Figure 2:
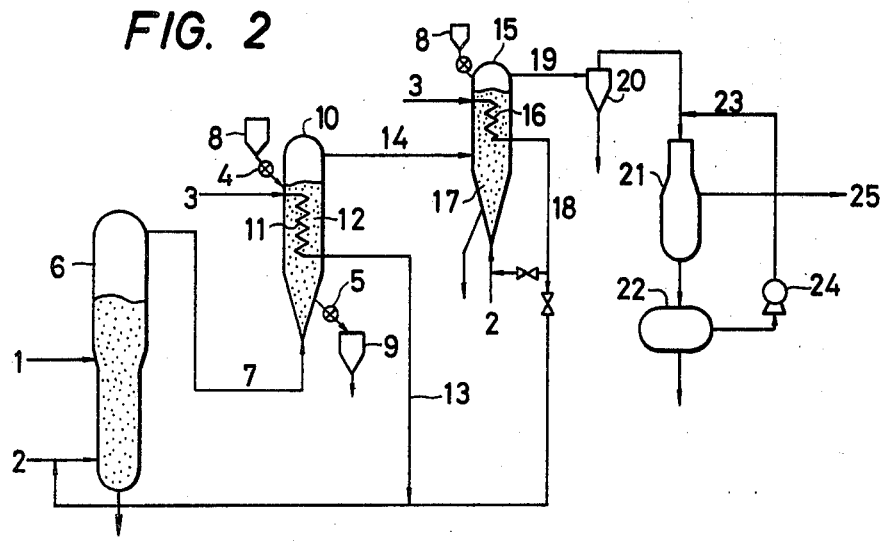
FIG. 2 is flow chart of the equipment to carry out the method of the invention.

FIG. 2 is a flow chart of a plant to carry out the method to recover the heat as high temperature steam from product gas produced by gasifying hydrocarbon materials with the fluidized bed heat exchange system and to utilize the high temperature steam as a gasifying agent by circulating it to the gasifier. In the chart, hydrocarbon material 1 of coal, etc. is gasified in the fluidized bed gasifier 6 with oxygen (or air) 2 and steam (or $H_2$ or $CO_2$). The temperature of product gas 7 is 700°–900° C. in this case. The rate of tar (oily matter) contained in the product gas depends on the materials, but it is usually about 5–15 wt% of the material.

Figure 1:
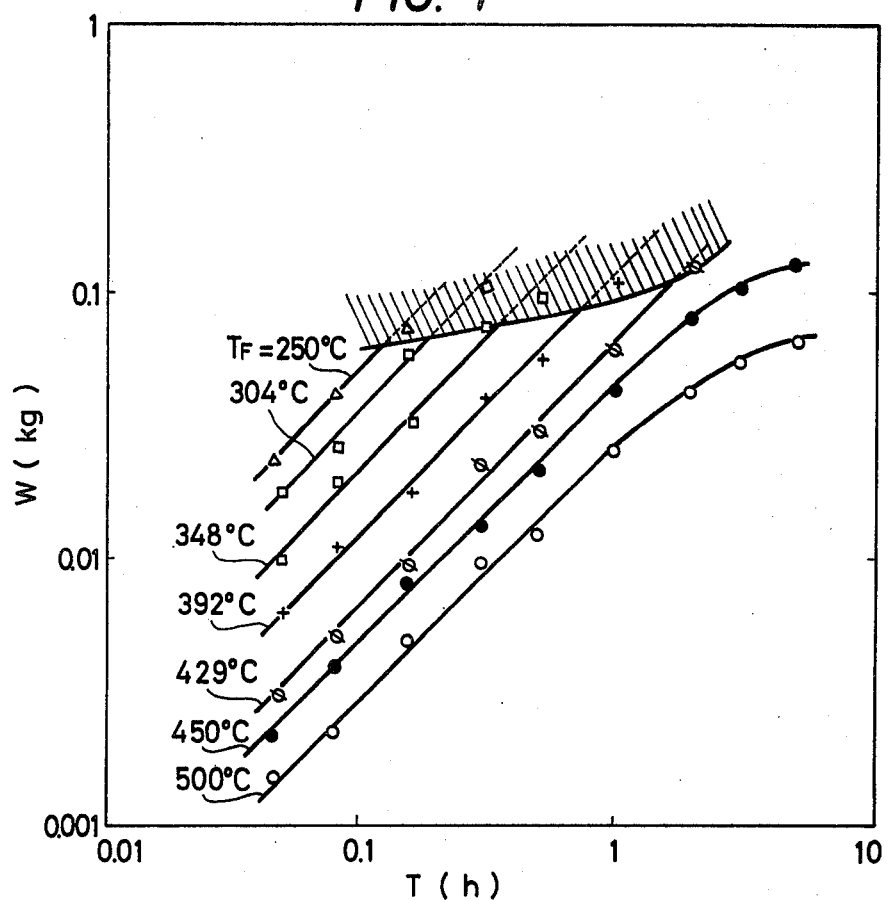
FIG. 1 is an explanatory diagram showing the weight increase of the fluidized bed particles with the passage of time.

Then the product gas 7 undergoes successive heat recovery treatment by the following high and low temperature fluidized bed heat exchangers which distinguish the invention. In the high temperature fluidized bed heat exchanger 10, the same solid carbon particles (char) as the gasifier 6 is adopted as fluidized particles 12 and high temperature thermal transfer tube 11 which is flowed water 3 therethrough is inserted in the fluidized bed. The fluidized bed temperature is set at about 450° C. which is near the lowest critical temperature where no fluidization hindrance occurs, and is kept at this temperature by controlling the flow quantity of water in the thermal transfer tube 11. The product gas 7 is introduced from the bottom of the high temperature fluidized bed heat exchanger 10 and water 3 is fed into the high temperature thermal transfer tube 11 with somewhat higher pressure than in gasifier 6. By the heat exchange, high temperature steam 13 with required temperature and pressure for gasifying agent in gasifier 6 is obtained and used in gasification of hydrocarbon materials 1. The high temperature fluidized bed heat exchanger 10 is provided with a feeding hopper 8 to feed fluidized particles and recovery hopper 9 to recover particles on which cokes deposit. As clear from the experimental results in FIG. 1, it is not necessary to feed fresh particles during operation, because no fluidization hindrance takes place at the operating temperature 450° C., and the feeding hopper 8 is used at the starting-up time to feed particles through the particle feeder 4. The weight increase rate drops with the passage of time by peeling off the cokes which deposit on the fluidized particles 12 in the bed with adequately settled flowing condition. Consequently, the recovery hopper 9 is used only when the particle weight temporarily increases for some reason, and in such a case, particles exhausted into the recovery hopper 9 are taken back to the combustion zone of gasifier 6 by particle ejector 5.

The high temperature heat recovery gas 14 from high temperature fluidized bed heat exchanger 10 still has sensible heat to be recovered, so it is introduced to the next step low temperature fluidized bed heat exchanger 15 and passed into the fluidized bed. The low temperature fluidized bed particles 17 consist of inorganic materials like sand, alumina, ore, etc. A feeding aperture for oxygen (or air) as an oxidizing agent similar to the gasifier 6 is provided at the bottom of the low temperature fluidized bed heat exchanger 15, and the combustion zone is formed in the spouted bed state where particles 17 are spouted, and particles are burned by oxygen 2 which is flowing into the vertical direction of the figure. On the other hand, the low temperature thermal transfer tube 16 is arranged to form heat recovery zone with a definite space above the oxygen feeding aperture in the low temperature fluidized bed heat exchanger 15. The temperature of the heat recovery zone is set at 250°–300° C. to obtain superheated steam with more than scores of atmospheric pressure. A part of the low temperature superheated steam 18 is used as gasifying agent of the low temperature fluidized bed heater exchanger 15 itself, and the another part is fed to the gasifier 6 together with the high temperature steam 13 from the high temperature fluidized bed heat exchanger 10.

Figure 3:
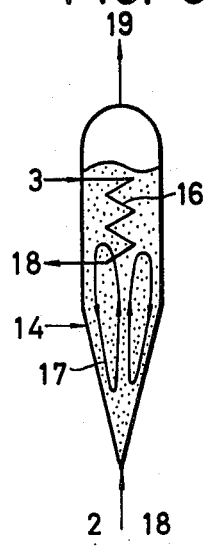
FIG. 3 is an outline drawing of the main part of the low temperature fluidized bed.

The heat recovery system in the low temperature fluidized bed heat exchanger 15 will be further described referring to FIG. 3. Circulation of particles 17 is caused as a form of so called spouted bed by oxygen 2 vertically blown up from the bottom of the low temperature fluidized bed heat exchanger 15. In consequence, oily matters (not collected by the high temperature fluidized bed heat exchanger 10) which is cooled by water in the low temperature thermal transfer tube 16 in the upper heat recovery zone but does not end in coking on the particles 17 move rapidly to the lower combustion zone and is burned here by oxygen 2. Regenerated particles 17 are moved again by gas stream to the upper heat recovery zone and become depositing agent of oily matters contained in the high temperature heat recovery gas 14. In this way, it is possible to carry out heat recovery and combustion (partial combustion) simultaneously in one fluidized bed by keeping apart for a definite distance of feeding position of high temperature recovery gas 14 and feeding aperture of oxygen 2. Moreover, oxygen 2 is consumed for combustion of deposits (carbon) on the particles 17, so the high temperature heat recovery gas 14 is exhausted as low temperature heat recovery gas 19 from the low temperature fluidized bed heat exchanger without combustion. No higher temperature than 400°–500° C. is needed in the combustion zone because the deposits on the particles 17 are in nearly liquid state rather than in solid state.

Figure 4:
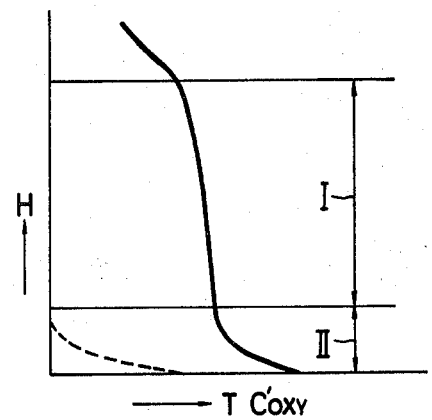
FIG. 4 is an explanatory diagram showing temperature distribution in the low temperature fluidized bed.

FIG. 4 shows distribution of temperature T in altitude direction H and distribution of oxygen concentration $C_{OXY}$. Heat is absorbed in the upper heat recovery zone I, and heat is generated in the lower combustion zone II. Therefore the distribution of temperature T is as described by a solid line in the figure. The difference between the upper and lower temperatures is affected by particle circulating quantity. In this embodiment, the particle residence time in heat recovery zone I should be short, which makes circulating quantity large, and, consequently, the temperature difference is not so large. Combustion reaction is so rapid that oxygen is consumed quickly and the oxygen concentration $C_{OXY}$ in the fluidized bed instantly decreases upward from the oxygen feeding point as shown with a dotted line in the figure. As a result, the upper heat recovery zone I becomes perfect reductive atmosphere, so, if high temperature heat recovery gas (product gas) 14 is fed in this part, this gas is not burned off. By controlling feeding quantity of oxygen used in this part, the temperature in heat recovery zone I of the low temperature fluidized bed heat exchanger 15 is controlled at the point of 250°-300° C. This feeding quantity of about 3-6% of oxygen used in the gasifier 6 is enough for complete combustion of deposits on particles 17 and the additional cost required for regenerating fuidized bed parti- In order to carry out the method of the invention, the practical operating conditions and efficiencies of the plant shown in FIG. 2 are listed in Table 1.

Each line number in the table indicates the line number in FIG. 2. Line 7 corresponds to the outlet of the products gas 7, line 14 corresponds to the outlet of the high temperature heat recovery gas 14 and line 19 corresponds to the outlet of the low temperature heat recovery gas 19. The quantity of oily matters in the table were measured quantitatively by directly sampling gas from each line, and the values of each data were obtained at the normal condition after stable operation of the plant for about 50 hours.

As evident from Table 1, the temperature of steam recovered from the high and low temperature fluidized bed heat exchangers are respectively 403° C. and 246° C., and the quantities are 13.2 kg/h and 8.3 kg/h respectively and the total makes 88% of thermal source of steam required as a gasifying agent. This indicates remarkably higher effect in comparison with 54% obtained in the conventional method using only the high temperature fluidized bed heat exchanger and proves the superior effect of the equipment having high and low temperature fluidized bed in the invention.

TABLE 1

| Location | | Gasifier | Line 7 | High temperature fluidized bed heat exchanger | Line 14 | Low temperature fluidized bed heat exchanger | Line 19 |
|---|---|---|---|---|---|---|---|
| Feeding | Material | 16.3 | — | | — | | |
| quantity | Oxygen | 11.0 | | | — | | 0.39 |
| of material (kg/h) | Steam | 24.3 | | | — | | 0.72 |
| Pressure | (kg/cm²G) | 3.0 | 3.0 | 3.0 | 3.0 | 3.0 | 2.9 |
| Temperature (°C.) | Line | | 715 | | 442 | | 273 |
| | Heat recovery zone | — | | 456 | | 291 | |
| | Thermal cracking zone | 809 | | — | | — | |
| | Partial combustion zone | 902 | | — | | 425 | |
| Gas | Product quantity (Nm³/h) | | 25.0 | | 25.0 | | 25.9 |
| Composition (Vol %) | N₂ | | 3.6 | | 3.6 | | 3.5 |
| | H₂ | | 28.6 | | 28.6 | | 28.8 |
| | CO | | 13.4 | | 13.4 | | 15.1 |
| | CO₂ | | 31.6 | | 31.6 | | 30.7 |
| | CH₄ | | 16.5 | | 16.5 | | 15.9 |
| | C₂ ~ C₃ | | 5.2 | | 5.2 | | 5.0 |
| | Oily matters (kg/h) | | 1.55 | | 1.15 | | 0.74 |
| Recovered Steam | Temperature (°C.) | | | 403 | | 246 | |
| | Flow quantity (kg/h) | | | 13.2 | | 8.3 | |
| | Heat rate (kcal/h) | | | 10332 | | 5876 | |
| | Materials | Taiheiyo coal + Iranian heavy residual oil (30:70) | | | | | | cles is very small.

The heat recovery gas is exhausted as low temperature heat recovery gas 19 from the low temperature fluidized bed heat exchanger 15 as shown in FIG. 2, removed dusts with the cyclone 20 and introduced to the scrubber 21 where oily matters of fraction below 250°-300° C. and dusts not collected by the cyclone are further removed. Though the gas 19 is instantly cooled at the inlet of the scrubber 21, plugging by coking does not occur in this part because the gas does not contain heavy fraction oily matter. The cooling water 23 in the scrubber 21 consists mainly of the water recovered from the scrubber itself which is used after separating light oily matter and dusts by the separator 22 and is circulated by the pump 24. The product gas 25 from the scrubber 21 is introduced to the gas purification section to be removed $H_2S$, $CO_2$ and $NH_3$.

The material rates of oily matters in product gas in lines 7, 14 and 19 were 9.5, 7.1 and 4.5 wt% respectively, and the equal effects were obtained to one obtained by decreasing about 3 wt% of oily matter quantity in the gasifier.

Figure 5:
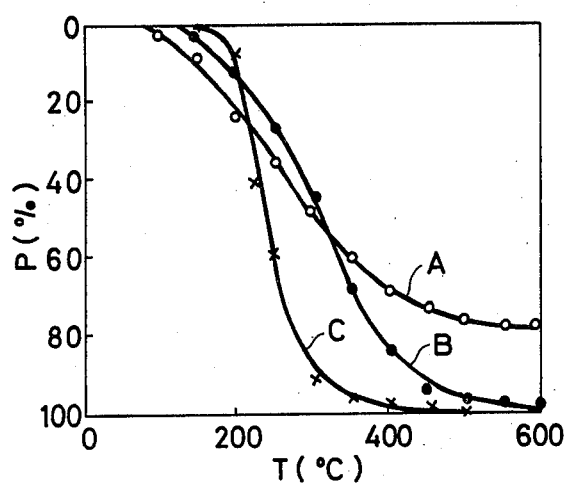
FIG. 5 is an explanatory diagram showing the weight decreasing property by heating of oily products.

The weight decreasing properties of oily matters recovered in lines 7, 14 and 19 measured by the thermo balance equipment are shown in FIG. 5 with curved A, B and C respectively. (The axis of abscissas represents heating temperatures T (°C.) and the axis of ordinates represents weight decreasing rate P (%).) In comparison with the outlet of the gasifier 6, heavy fraction in oily matters at the outlet of the low temperature fluidized bed heat exchanger 15 is extremely little, and the fraction above 350° C. is several percent. At the time of rapid cooling at the inlet of the scrubber 21, almost no coking caused plugging as mentioned above. This is substantiated by that the oily matters were light fraction only as shown in FIG. 5.

The particle circulation in low temperature fluidized bed is influenced by velocity of gasifying agent. Particle speed could not be directly measured in the embodiment, so the value was estimated from heat absorption in the bed. It turned out to be 500 kg/h and the average resilience time of the particles in the heat recovery zone was 0.1 hour.

Figure 6:
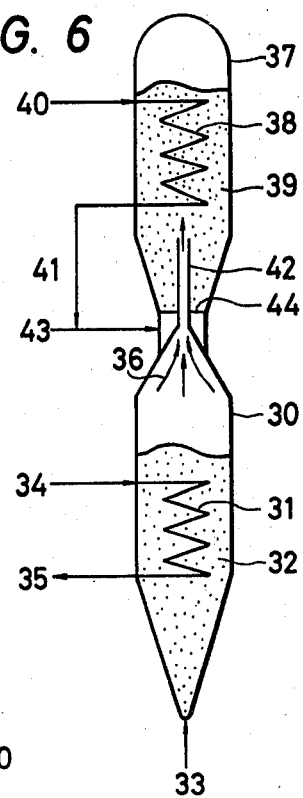
FIG. 6 is an outline drawing of another embodiment of this invention.

FIG. 6 shows another embodiment in which low and high temperature fluidized bed heat exchangers are directly connected in one vessel and the particles in the upper low temperature fluidized bed heat exchanger is circulated by product gas from the high temperature fluidized bed heat exchanger. In the figure, the high temperature fluidized bed heat exchanger 30 has heat transfer tube 31 as in the case of the FIG. 2 in the fluidized bed 32. The heat in the product gas is recovered as high temperature steam 35 by heat exchange between water 34 and high temperature product gas from the gasifier (not shown) and high temperature heat recovery gas 36 is exhausted. On the other hand, the low temperature fluidized bed heat exchanger 37 is provided just above the high temperature heat exchanger 30 and the heat transfer tube 38 is arranged in the fluidized bed 39 so that the heat is recovered as low temperature steam 41 by heat exchange between water 40 and the high temperature heat recovery gas 36.

The outlet of high temperature heat recovery gas 36 at the top of the high temperature fluidized bed heat exchanger 30 is stretched by connecting pipe 42 and has its opening at the lower part of the low temperature fluidized bed heat exchanger 37. Feeding aperture of oxygen 43 is provided below the connecting pipe opening with a definite distance and oxygen is fed into the low temperature fluidized bed through gas distributor 44.

In this embodiment, the gas 36 from the high temperature fluidized bed heat exchanger 30 is blown through the connecting pipe 42 at a high speed to the lower part of the low temperature fluidized bed and blow up the particles 39 to cause circulating flow. The particles on which oily matters deposited in the upper heat recovery zone move to the lower combustion zone to be burned and regenerated. In this way, heat recovery is carried out with rapid and massive regenerating and circulating of fluidized particles by the high temperature recovery gas 36 in the low temperature fluidized bed heat exchanger 37.

By the heat recovery method of this invention, as described above, the heat recovery quantity of product gas by the fluidized bed heat exchanger increases and the possibility of plugging by coking at the gas cooling remarkably decreases.

What is claimed is:

1. A heat recovery method from gasified products of hydrocarbon to recover heat by introducing gas containing oily matters produced by gasifying hydrocarbon and by indirect heat exchange between the said product gas and the cooling agent passing through the heat transfer tube provided in the fluidized bed, in which said gas is passed through the said high temperature fluidized bed kept at about 450°–500° C. and then through the low temperature fluidized bed kept at about 250°–300° C. successively and that the heat of said product gas is recovered by heat exchange in said high temperature fluidized bed and low temperature fluidized bed respectively.

2. A heat recovery method from gasified products of hydrocarbon in accordance with the claim 1, in which at the said low temperature fluidized bed, a heat transfer tube is set above a blow-in point of gas from the outlet of said high temperature fluidized bed, and a combustion zone is formed by providing a blow-in point of oxidizing gas below said blow-in point with a predetermined distance and the fluidized bed particles are circulated between said heat recovery zone and the combustion zone by blowing in at least one of the oxidizing gas and the gas from said high temperature fluidized bed.

* * * * *